– – –

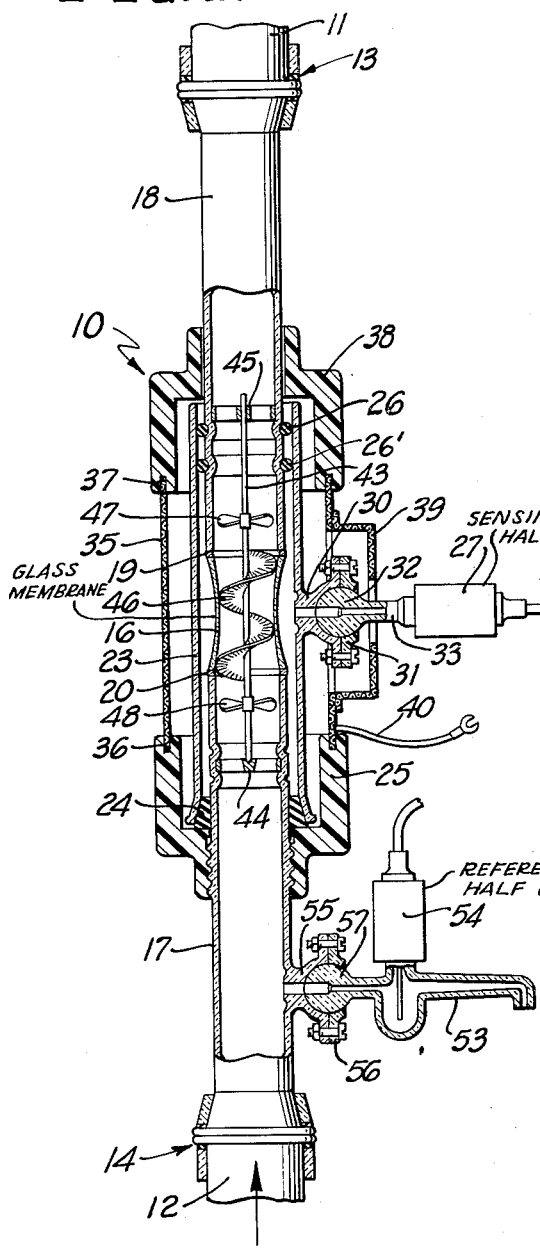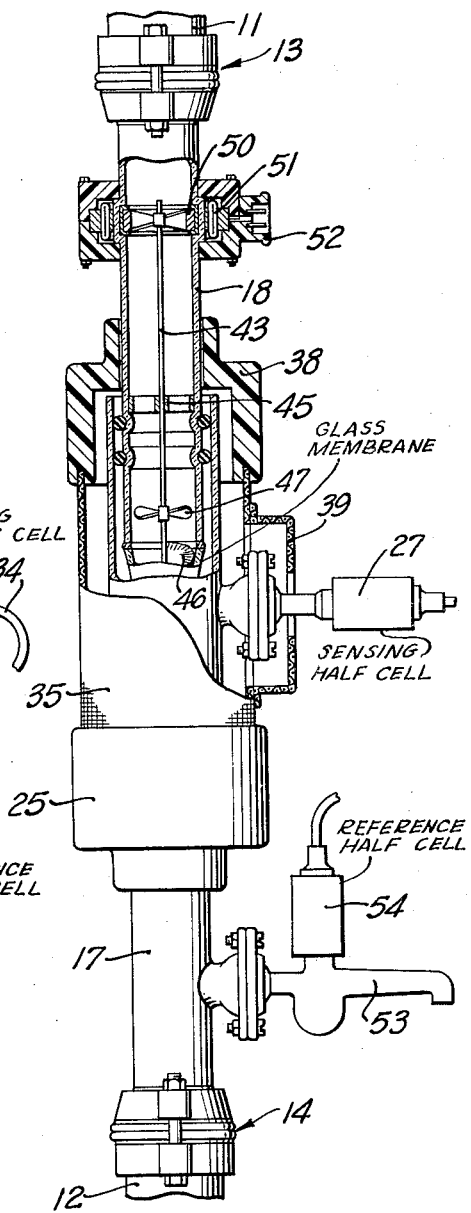
INVENTORS
EDWIN P. ARTHUR,
JOHN E. LEONARD
BY THEIR ATTORNEYS
HARRIS, KIECH, RUSSELL & KERN

3,216,915
FLOW CELL FOR ION POTENTIAL MEASUREMENTS
Edwin P. Arthur and John E. Leonard, Fullerton, Calif., assignors to Beckman Instruments, Inc., a corporation of California
Filed Dec. 12, 1961, Ser. No. 158,907
5 Claims. (Cl. 204—195)

This invention relates to ion potential measurements in fluids and, in particular, to a new and improved cell structure for continuous measurements in flowing streams. The cell of the invention is particularly adapted for use with slimy or loaded streams and with slurries, which tend to deposit coatings on the walls of the lines and plug small openings therein.

It is an object of the invention to provide an ion potential measuring cell for use with continuous flowing streams with the ion sensitive membrane built into the flow line. A further object is to provide such a structure in which the sensitive membrane is a tubular section of the line.

It is an object of the invention to provide a new and improved flow cell structure with the sensitive membrane of the line enclosed in a housing providing an electrolyte space about the membrane. A further object is to provide such a structure including a half cell contacting the electrolyte to provide an external connection for the structure.

It is an object of the invention to provide a flow cell with an ion sensitive membrane built in the flow line and means for continuously cleaning the interior surface of the membrane. A specific object is to provide such a structure incorporating a cleaning device built into the flow line with the device being actuated to clean the membrane surface. A further object is to provide such a structure in which the device is driven by the energy of the flowing stream. Another object is to provide such a structure in which the device is driven from an external source such as an electric motor.

It is an object of the invention to provide a new and improved flow cell structure including means for coupling a reference half cell to the stream. A further object is to provide such a structure in which the reference half cell is positioned out of the main flow line but on a flowing sample stream to provide continuous contact with the sample. A particular object is to provide a structure including a drain tube coupled to the main flow line with the reference half cell positioned in the drain tube. Another object is to provide a drain tube with a pivoting connection to the flow line for regulating the rate of flow through the drain tube.

It is an object of the invention to provide an ion potential measuring cell including an electrically insulated tube having a section in the form of an ion sensitive glass membrane, means for flowing a stream of sample through the tube past the membrane, a housing positioned about the section and defining an electrolyte space between the tube and housing, a first half cell for contacting the sample, and a second half cell for contacting the electrolyte.

It is an object of the invention to provide an ion potential measuring cell including a sample flow line comprising a first tube of an ion sensitive glass membrane positioned between second and third aligned insulating tubes, means for flowing the sample through the line, a housing positioned about the line and enclosing the first tube, with the housing and line defining an annular electrolyte space therebetween, first and second half cells, means for coupling the first half cell to the sample in one of the insulating tubes, and means for coupling the second half cell to the electrolyte in the electrolyte space.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:
FIG. 1 is a sectional view of a preferred embodiment of the invention; and
FIG. 2 is a sectional view of an alternative embodiment of the invention.

FIG. 1 illustrates a flow cell 10 which is positioned between two lengths 11, 12 of a fluid line with conventional flange couplings 13, 14, respectively. The flow cell includes a flow line comprising an ion sensitive section 16 fixed between insulating sections 17, 18. Typically, the ion sensitive section may be a tubular membrane of ion sensitive glass joined to the sections 17, 18 with grade seals 19, 20, respectively, with the sections 17, 18 being of glass with a relatively high electrical resistance. The glass used in making the ion sensitive section 16 may be any glass suited to the purpose, such as one of the glasses used in the various ion potential measuring electrodes currently in use. The particular ion sensitive glass will be selected depending upon the particular type of measurement to be made. The tubular section carrying the sensitive membrane may have a slightly pinched configuration as shown in FIG. 1 to increase the rate of flow of fluid therethrough and reduce the tendency to deposit material on the inner wall thereof.

A housing for an electrolyte is provided about the portion of the flow line carrying the ion sensitive membrane and a preferred form of housing structure is shown in FIG. 1. A glass tube 23 is positioned about the line and sealed at the lower end with an annular gasket 24 resting on a cup 25. The cup 25 may be mounted on the tubing 17 as by engagement of mating threaded portions on the cup and tubing. O-ring seals 26, 26' are provided at the upper end of the tube 23, the seals preferably resting in peripheral grooves formed in the tubing 18. This type of sealing at the upper end of the electrolyte housing permits relative motion of the housing and the flow line which might occur due to differences in temperature coefficient of expansion.

The space between the housing tubing 23 and the flow line is charged with an electrolyte to cover the ion sensitive section 16 and a conventional sensing half cell 27 is provided for coupling with the electrolyte. The half cell may be mounted directly in the wall of the tubing 23 for contacting the electrolyte but a preferred mounting structure is shown in FIG. 1.

A boss 30 on the tubing 23 and a mating flange 31 provide a spherical socket for a ball 32 on the end of a line 33 carrying the half cell 27. A flow passage is provided through the boss 30 and ball 32 permitting fluid flow between the electrolyte space and the half cell. An electrical cable 34 provides a connection from the half cell to a conventional potentiometer amplifier.

A perforated or woven wire screen 35 may be positioned about the housing and ion sensitive section providing mechanical protection and electrical shielding for the structure. In the preferred embodiment shown herein, the screen is tubular in form and rests in a groove 36 in the cup 25 and a similar groove 37 in another cup 38. An enlarged section 39 may be formed in the screen to provide space for the half cell coupling. The cup 38 is preferably made a sliding fit on the tube 18 to provide for differences in temperature coefficient of expansion. A conductor 40 may provide a connection between the screen 35 and circuit ground or other suitable point.

Means may be provided within the flow cell for continuously cleaning the inner surface of the sensitive membrane preventing formation of deposits or coatings thereon which would adversely affect the operation of the cell. In the preferred embodiment shown herein, a shaft 43 is journaled in a bushing 44 supported in a spider carried between a pair of annular shoulders in the tube 17 and in another bushing 45 supported in a spider carried above a shoulder in the tube 18. A brush, shown here as a helical bristle brush 46, is carried on the shaft 43 and contacts the inner surface of the section 16 as the shaft rotates. Impeller blades 47, 48 are fixed to the shaft and rotate the shaft as the sample flows through the cell using the energy of the flowing sample to provide the brushing action.

An alternative structure for rotating the brushing shaft is shown in FIG. 2. The rotor 50 of an electric motor is fixed to the shaft 43 within the tube 18. The stator 51 of the motor is positioned about the tube 18 in alignment with the rotor. A coupling 52 provides for connecting a source of power to the motor for driving the shaft 43.

The cell structure of the invention includes means for coupling a reference half cell to the flowing sample stream. The reference half cell may be directly immersed in the flowing sample but preferably is positioned remote from the flowing sample to reduce the effects of pressure, flow surges, abrasion and mechanical shock produced by the flowing stream. In the preferred embodiment shown herein, a drain tube or chamber 53 is coupled to the tube 17 and the reference half cell 54 is disposed in the drain tube. The drain tube is coupled to the flow line by a throttling device in the same manner as the tube 33 which carries the half cell 27. The throttling device includes a boss 55 on the tube 17, a mating flange 56, and a ball 57 on the inlet end of the drain tube. The outlet end of the drain tube is directed to a suitable sink, such as a container at atmospheric pressure. A portion of the sample which flows through the cell flows out through the drain tube continuously thereby providing a continuous coupling of the sample to the half cell 54. The rate of flow of sample through the drain tube may be controlled by pivoting the drain tube with the ball 57 and boss 55 functioning as a flow control valve.

In a typical application of the flow cell of the invention, the sensitive membrane may be a hydrogen ion sensitive glass such as is used in conventional pH glass electrodes, the electrolyte in the electrolyte space a well-buffered solution with respect to pH and silver chloride, and each of the half cells 27 and 54 a silver wire with a silver chloride coating thereon.

The flow cell of the invention may be directly inserted in a flow line for measuring ion potential in the stream. The directly insertable cell introduces a minimum impedance to flow in the line and avoids stream segregation. The cell structure does not develop any stagnant zones for the sample, provides continuous measurements of the immediate sample stream condition and incorporates a continual cleaning of the ion sensitive surfaces.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In an ion potential measuring cell, the combination of:
   a sample flow line comprising a first tube of an ion sensitive glass membrane positioned between second and third aligned insulating tubes, said line being adapted to receive a stream of sample therethrough;
   permanent brushing means positioned within said line and mounted for rotation about the axis of said tubes for brushing the inner surface of said first tube, said brushing means including an impeller adapted for rotation by the stream of sample;
   a housing directly surrounding said line and enclosing said first tube, said housing and line providing an annular electrolyte reservoir;
   a sample drain tube having an inlet and an outlet;
   refrence electrode means mounted in said drain tube for coupling to the fluid flowing therethrough;
   means for mounting said drain tube at the inlet thereof on one of said insulating tubes for flow of sample through the drain tube, said mounting means including a means for varying the flow rate of sample past the reference electrode means, said outlet and said flow rate varying means being arranged to be simultaneously open whereby a portion of said sample stream may pass continuously through said drain tube during flow of said sample stream through said sample flow line;
   a half cell disposed outside of said flow line;
   means for coupling said half cell to said electrolyte reservoir; and
   said sample flow line being relatively straight along the portion thereof enclosing said brushing means and beyond opposite ends of said brushing means.

2. In an ion potential measuring cell, the combination of:
   an electrically insulated tube having a section intermediate the ends thereof in the form of an ion sensitive glass membrane, said tube being adapted to receive a stream of sample therethrough;
   housing means directly surrounding said glass membrane section providing an electrolyte reservoir external of said section;
   reference electrode means, means for coupling said reference electrode means to the sample flowing through said tube;
   half cell means, means for coupling said half cell means to said electrolyte reservoir;
   permanent rotatable brushing means mounted coaxially within said tube and contacting said glass membrane section, said brushing means including impellar means responsive to the kinetic energy of said stream for rotating said brushing means to clean the inner surface of said glass membrane during the flow of sample through said tube; and
   said tube being relatively straight along the portion thereof enclosing said brushing means and beyond opposite ends of said brushing means.

3. A measuring cell as set forth in claim 2 including a permanent electric drive motor with the stator mounted outside and surrounding said tube and the rotor mounted inside said tube and fixed to said brushing means for rotating said brushing means.

4. A measuring means as set forth in claim 2 wherein said means for coupling said reference electrode means to the sample flowing through the said tube includes a chamber having a vent to ambient pressure outside of said tube, said chamber receiving said reference electrode means; and means defining a passage between said tube and said chamber for diverting a relatively small portion of the stream to said chamber whereby said small portion of said sample stream may pass continuously through said chamber and exit from said vent during flow of said sample stream through said tube.

5. In an ion potential measuring cell, the combination of:
   an electrically insulated continuous tube having a section intermediate the ends thereof in the form of an ion sensitive glass membrane, said tube being adapted to receive a stream of sample therethrough;
   housing means directly surrounding said glass membrane section providing an electrolyte reservoir external of said section;

reference electrode means, means for coupling said reference electrode means to the sample flowing through said tube;

half cell means, means for coupling the half cell means to said electrolyte reservoir;

rotatable brush means mounted coaxially within said tube and contacting said glass membrane section;

a permanent electric drive motor with the stator mounted outside of and surrounding said tube and the rotor mounted inside said tube and fixed to said rotatable brush means for rotating said brush means to clean the inner surface of said glass membrane; and said tube being relatively straight along the portion thereof enclosing said brush means and beyond opposite ends of said brush means.

References Cited by the Examiner

UNITED STATES PATENTS

| | | |
|---|---|---|
| 2,117,596 | 5/38 | Bender et al. |
| 2,201,659 | 5/40 | Young. |
| 2,311,976 | 2/43 | Coleman. |
| 2,870,077 | 1/59 | Kushner _____ 204—195 |
| 2,870,078 | 1/59 | Hood _____ 204—195 |
| 2,968,535 | 1/61 | Arthur et al. |
| 3,051,631 | 8/62 | Harbin et al. |
| 3,126,328 | 3/64 | Hutchison et al. _____ 204—196 |

FOREIGN PATENTS 695,776   8/61   Great Britain.

JOHN H. MACK, *Primary Examiner.*

JOSEPH REBOLD, WINSTON A. DOUGLAS,
*Examiners.*